United States Patent [19]
Franz

[11] Patent Number: 5,407,285
[45] Date of Patent: Apr. 18, 1995

[54] POINTING STICK IN A COMPUTER KEYBOARD FOR CURSOR CONTROL

[76] Inventor: Patrick J. Franz, 1849 SE. 43rd, Portland, Oreg. 97214

[21] Appl. No.: 275,946

[22] Filed: Jul. 14, 1994

Related U.S. Application Data

[60] Continuation-in-part of Ser. No. 104,777, Aug. 16, 1993, which is a continuation-in-part of Ser. No. 96,485, Jul. 22, 1993, abandoned, which is a division of Ser. No. 557,546, Jul. 24, 1990, Pat. No. 5,231,386, and a continuation-in-part of Ser. No. 11,676, Aug. 9, 1993, and a continuation-in-part of Ser. No. 18,842, Feb. 16, 1994.

[51] Int. Cl.[6] ................................ B41J 5/28
[52] U.S. Cl. .................... 400/490; 400/485; 200/6 A; D14/115
[58] Field of Search ............... 400/490, 485, 481; 235/145 R, 146; 341/22, 34; 200/5 A, 6 A, 5 R; D16/161, 160, 167, 162, 163; 345/160, 157, 161, 168, 145, 158, 184; D14/115

[56] References Cited

U.S. PATENT DOCUMENTS

| | | | |
|---|---|---|---|
| 3,523,184 | 8/1970 | Vogel | 235/145 R |
| 4,680,577 | 7/1987 | Straayer et al. | 345/160 |
| 4,947,461 | 8/1990 | Yoshioka et al. | 200/5 R |
| 5,012,230 | 4/1991 | Yasuda | 345/184 |
| 5,204,511 | 4/1993 | Baitz et al. | 235/145 R |

OTHER PUBLICATIONS

Bennett et al. "Digital Joystick Switch" IBM Technical Disclosure Bulletin, vol. 21, No. 12, May 1979.
"Cover Story: Green Machine," PC Magazine, May 25, 1993, p. 135.
Toshiba's Sale Flyer "Portégë" Models T3400CT & T3400.

*Primary Examiner*—Edgar S. Burr
*Assistant Examiner*—Anthony H. Nguyen
*Attorney, Agent, or Firm*—Marger Johnson McCollom & Stolowitz

[57] ABSTRACT

Apparatus for use in a computer keyboard for cursor control is disclosed. The apparatus includes a compound key which serves for both typing a character and for pointing operations, i.e. for cursor control like a mouse. For pointing operations, a pointing stick or shaft is pressed in a desired direction by a user for moving a cursor in a corresponding direction on a display screen. The pointing stick is disposed in an aperture that extends through a modified key cap, so that no additional keyboard space is required for the pointing device, thereby obviating a separate mouse, keyboard mounted trackball or the like. In an alternative embodiment, the pointing stick extends through an aperture in the keyboard space bar. In another embodiment, adjacent key caps are modified so as to fit closely around the key cap that houses the pointing stick without interfering with operation of either the pointing stick or the keyswiches.

11 Claims, 7 Drawing Sheets

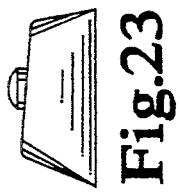
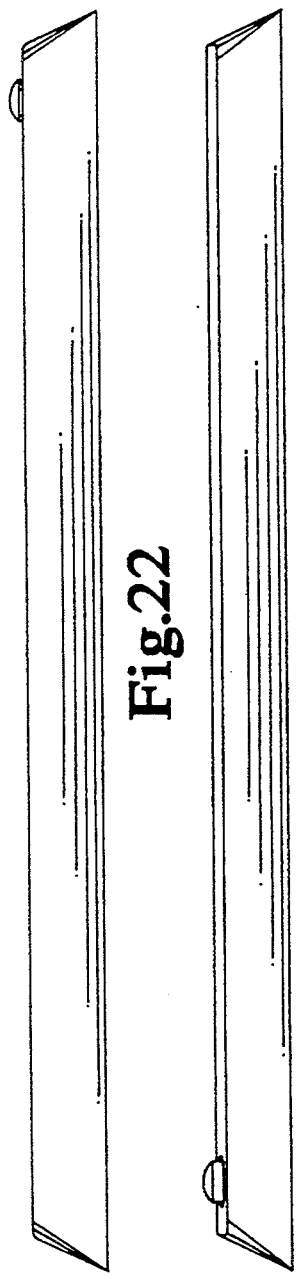
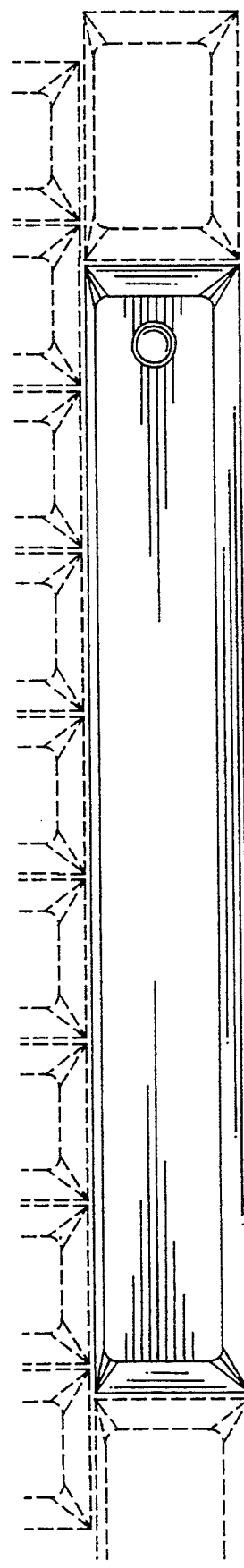
Fig.23
Fig.22
Fig.24
Fig.25
Fig.26

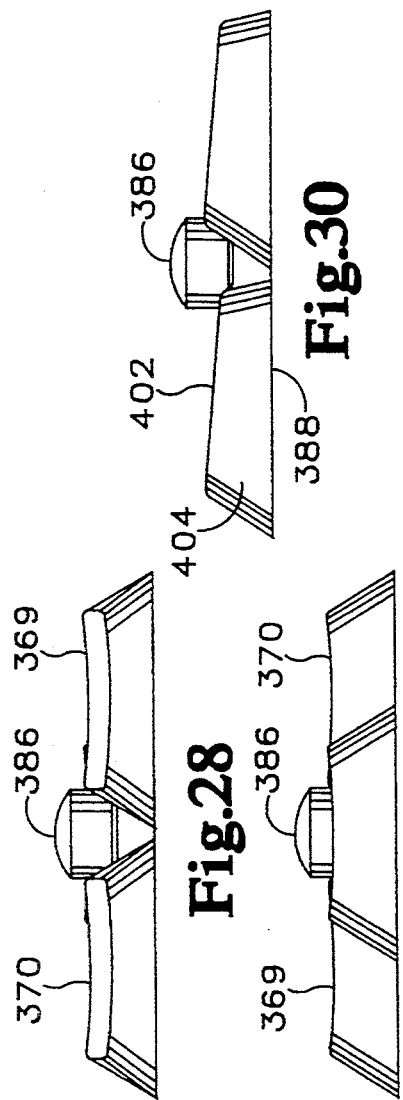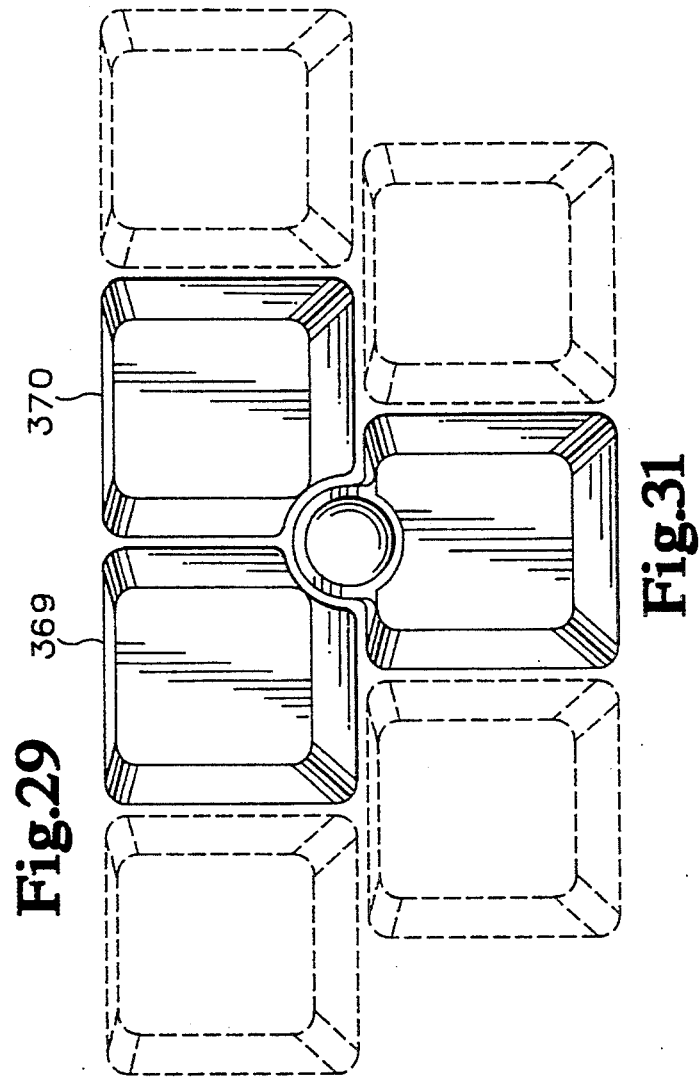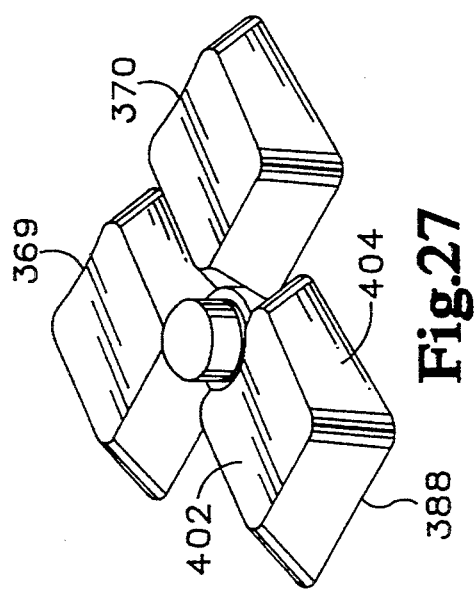

POINTING STICK IN A COMPUTER KEYBOARD FOR CURSOR CONTROL

This application is a continuation-in-part of commonly-assigned, U.S. application Ser. No. 08/104,777, filed Aug. 16, 1993, entitled MINIATURE ISOMETRIC JOYSTICK which is a continuation-in-part of commonly-assigned, U.S. application Ser. No. 08/096,485, filed Jul. 22, 1993, now abandoned, entitled KEYBOARD INTEGRATED POINTING DEVICE which is a division of U.S. application Ser. No. 07/557,546, filed Jul. 24, 1990, now U.S. Pat. No. 5,231,386, entitled KEYSWITCH INTEGRATED POINTING ASSEMBLY; a continuation-in part of commonly-assigned, U.S. application Ser. No. 29/011,676, filed Aug. 9, 1993, entitled COMPOUND KEY FOR TYPING AND POINTING OPERATIONS IN A COMPUTER KEYBOARD; and a continuation-in-part of commonly-assigned, U.S. application Ser. No. 29/018,842, filed Feb. 16, 1994 entitled POINTING STICK AND KEYCAP ENSEMBLE FOR USE IN A COMPUTER KEYBOARD, all incorporated herein by this reference.

BACKGROUND OF THE INVENTION

1. Field of the Invention

The present invention relates generally to apparatus for controlling cursor movement on a video display terminal (VDT) and more particularly to a pointing stick apparatus which is integrated together with keyswitches on a computer keyboard so as to minimize the size of the keyboard.

2. Description of the Related Art

Prior art keyboard pointing devices for controlling a cursor on a VDT are known. For example, U.S. Pat. No. 4,680,577 to Straayer, et al. (the '577 patent) discloses a multi-purpose key on a computer keyboard for controlling the cursor. Strain gauges are coupled to the multi-purpose key, which also serves as a regular typing key, for sensing lateral forces applied by the user's fingertip for cursor control. One of the problems with prior art devices, even those that are force-sensitive, is that a user gets no response to lateral displacement initially, until an electrode makes initial contact, for example, with an elastomeric resistive layer. The initial contact causes a step response, as resistance drops from infinity to a measurable value—a jump the user may not have anticipated or desired. Then, as force is increased, resistance falls rapidly, over some range, and finally falls more slowly with the application of additional force. All of this is disconcerting to a user for most applications. U.S. Pat. No. 5,231,386 (the '386 patent) discloses a keyswitch-integrated pointing device in which the force sensors are "preloaded" to an operating state such that there is no "jump" when a user starts to point to move the cursor. International patent application PCT/US90/06831 owned by Lexmark International also shows pointing apparatus for use in a keyboard for cursor control.

Most prior art "joysticks" are not sensitive to vertical or "Z-axis" force, because they have a rigid pivot or support underlying the joystick handle. As a result, vertical force cannot be measured or detected. The '386 patent shows how to produce a signal proportional to vertical force. Such a signal can be used, for example, to control line width while drawing as a function of z-axis force on the pointing device.

One problem with the prior apparatus is that the multi-purpose keyswitch or integrated keyswitch combines typing and cursor control into the same keycap. Some users, however, prefer to have a separate, different control or button for cursor control. A separate button is advantageous because the computer can detect actuation of the cursor control as distinguished from typing. The prior art '577 patent, for example, required a separate switch to enable the pointing sensors, since they were built into the typing key. A separate "pointing stick" has this advantage and does not require another switch; it can remain always "on". However, a separate pointing stick takes up precious keyboard space. For example, some portable or laptop computers have a trackball below the spacebar or off the side of the keyboard. These are not convenient. The need remains therefore to provide a pointing stick for cursor control without taking any space on the keyboard.

SUMMARY OF THE INVENTION

The present invention comprises a pointing stick built into a keyboard together with one or more regular typing keys. This combination is called a "compound key". In a first embodiment, a "compound key" has a pointing stick that extends upward through one side wall of the key cap.

According to a second embodiment, the compound key includes a pointing stick that extends through a corner of the key cap.

According to a third embodiment, the compound key includes a key cap having a rounded extension on a corner of the key cap, the rounded extension having a central aperture, and a pointing stick extends through the aperture.

According to a fourth embodiment, the compound key includes a pointing stick that protrudes though a hole in the space bar of a computer keyboard.

According to a fifth embodiment of the invention, a keycap ensemble comprises a set of three modified keycaps, together with a pointing stick extending through one of the modified key caps. Each of the first, second and third key caps is coupled to a respective underlying keyswitch for typing a corresponding alphanumeric character. For example, the first, second and third key caps may be arranged adjacent each other in a generally triangular configuration for fitting within the usual typing array of key caps in a computer keyboard. The first key cap has a rounded extension forerod along a selected face thereof, and the extension has a central aperture formed therein for receiving a "pointing stick" shaft. The shaft is sized and arranged so as to extend through the aperture to a predetermined height slightly above a top surface of the first key cap for actuation by a user's fingertip. The aperture is sized so as to allow slight lateral motion of the shaft for cursor control.

The apparatus is designed to fit within a keyboard typing array without altering its dimensions. Toward that end, at least one of the second and third key caps had a modified region so as to form a generally concave gap between the said one key cap and the rounded extension of the first key, whereby the said rounded extension does not interfere with normal operation of the adjacent key cap. In a preferred embodiment, the rounded extension is formed along a rear face of the first key cap; and each of the second and third key caps includes a respective modified portion so as to form a corresponding concave gap between each of the second and third key caps and the rounded extension of the first key cap, whereby all three key caps fit closely together and provide for cursor control through the said shaft without interference with normal typing operations.

Force sensing means such as force-sensitive resistors are coupled to the shaft for sensing forces applied to the shaft by the user for cursor control. More specifically, the shaft is fixed to an actuator plate, and protruding surfaces of the actuator plate are arranged to impart such forces to the force-sensitive resistor areas. Various other force or pressure sensing means such as strain gauges may be used is similar manner.

The foregoing and other objects, features and advantages of the invention will become more readily apparent from the following detailed description of a preferred embodiment which proceeds with reference to the drawings.

BRIEF DESCRIPTION OF THE DRAWINGS

FIG. 22 is a rear elevational view of the compound key of FIG. 21;

FIG. 23 is a side view of the compound key of FIG. 21;

FIG. 24 is a front elevational view of the compound key of FIG. 21;

FIG. 25 is a top view of the compound key of FIG. 21 shown disposed in a computer, the surrounding keys being shown in phantom;

FIG. 26 is a bottom view of the compound key of FIG. 21.

FIG. 27 is a perspective view of a pointing stick and keycap ensemble, according to the present invention;

FIG. 28 is a rear elevational view thereof;

FIG. 29 is a front elevational view thereof;

FIG. 30 is a right side, elevational view, the left side being substantially a mirror image thereof;

FIG. 31 is a top plan view thereof.

DETAILED DESCRIPTION OF THE PREFERRED EMBODIMENTS

Figure 1:
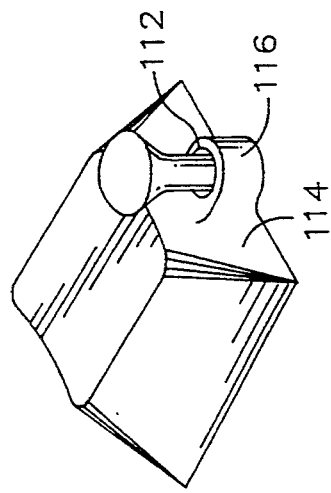
FIG. 1 is a perspective view of a compound key according to the first embodiment of the invention.
Figure 6:
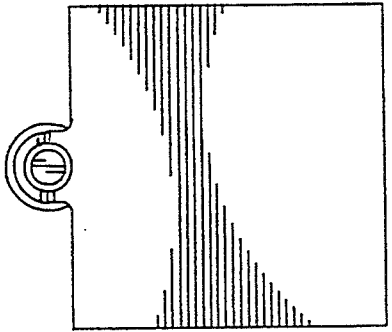
FIG. 6 is a bottom view of the compound key of FIG. 1.
Figure 3:
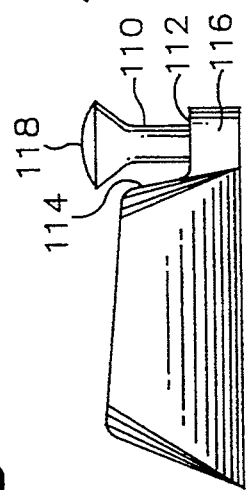
FIG. 3 is a right side view of the compound key of FIG. 1.
Figures 2, 4:
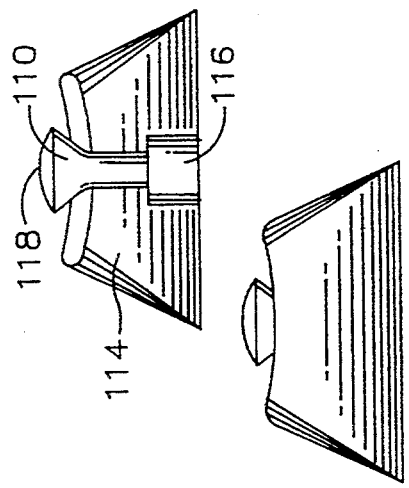
FIG. 2 is a front view of the compound key of FIG. 1.
FIG. 4 is a rear elevational view of the compound key of FIG. 1.
Figure 5:
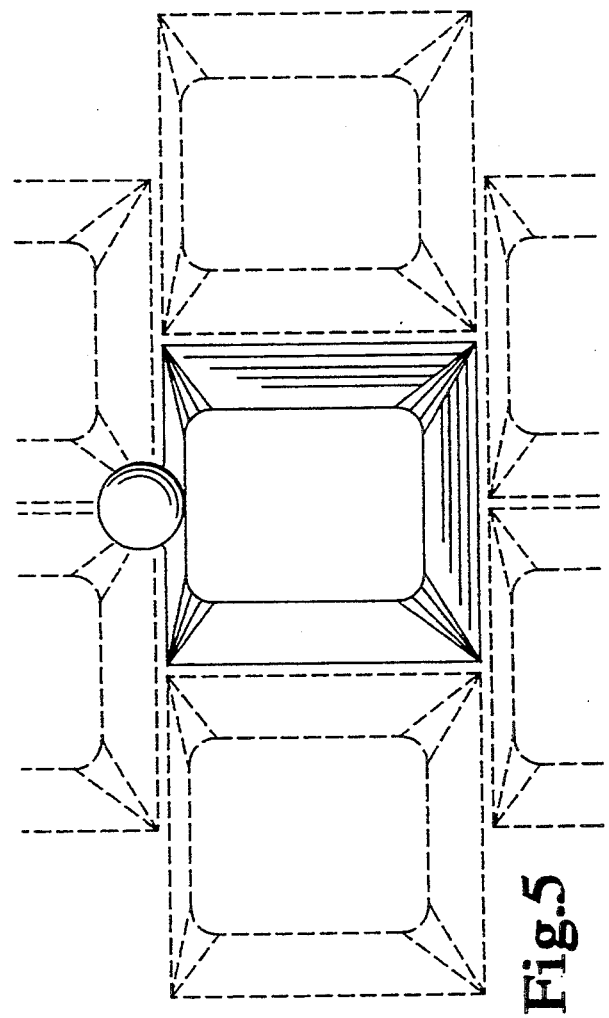
FIG. 5 is a top view of the compound key of FIG. 1 shown disposed in a keyboard, the surrounding keys being shown in phantom.
Figure 7:
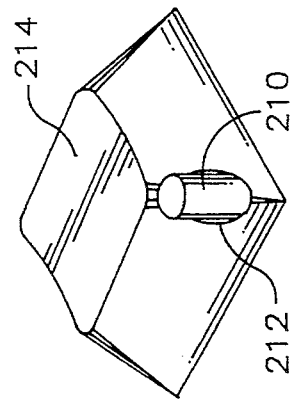
FIG. 7 is a perspective view of the second embodiment of the compound key.
Figure 13:
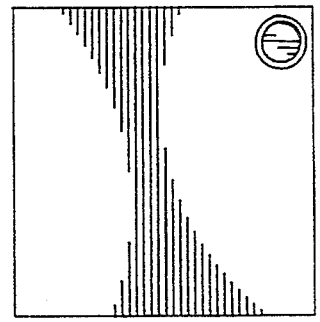
FIG. 13 is a bottom view of the compound key of FIG. 7.
Figure 9:
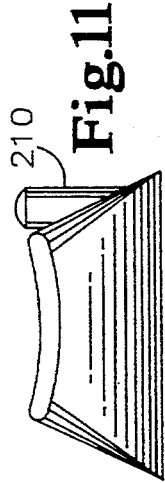
FIG. 9 is a left side view of the compound key of FIG. 7.
Figure 8:
FIG. 8 is a front elevational view of the compound key of FIG. 7.
Figure 11:
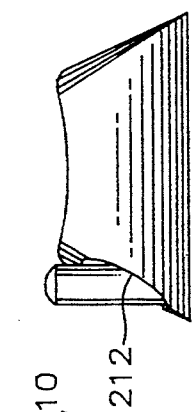
FIG. 11 is a rear elevation view of the compound key of FIG. 7.
Figure 10:
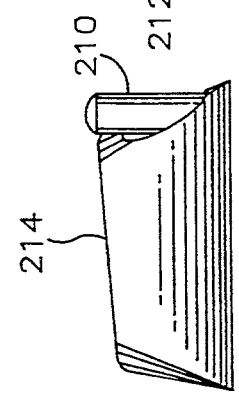
FIG. 10 is a right side view of the compound key of FIG. 7.
Figure 12:
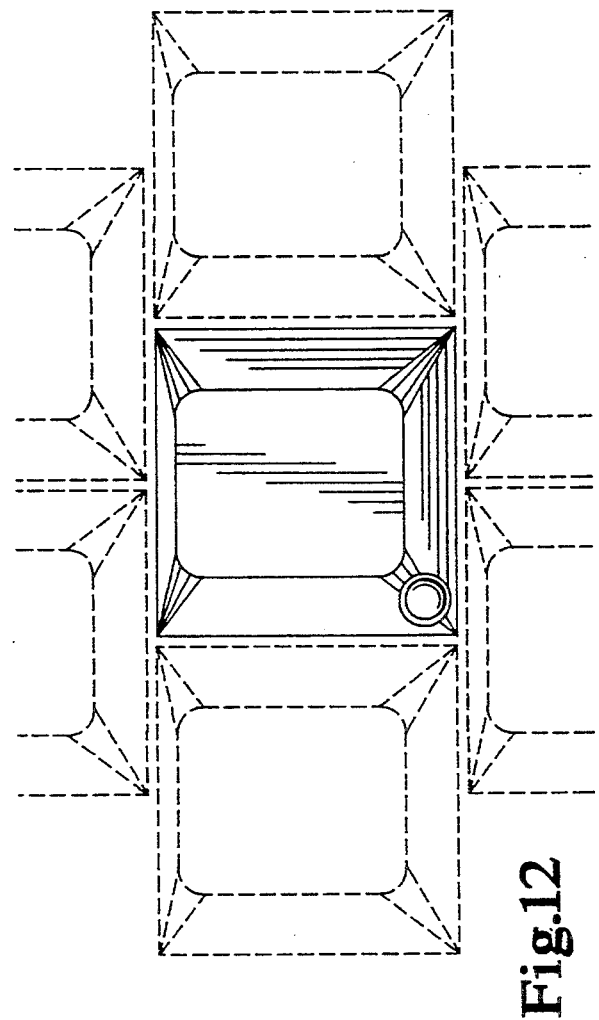
FIG. 12 is a top view of the compound key of FIG. 7 shown disposed in a computer keyboard, the surrounding keys being shown in phantom.
Figure 14:
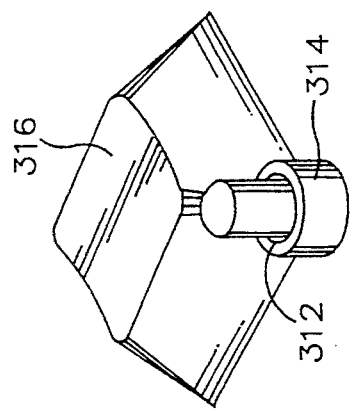
FIG. 14 is a perspective view of a third embodiment of the compound key.
Figure 17:
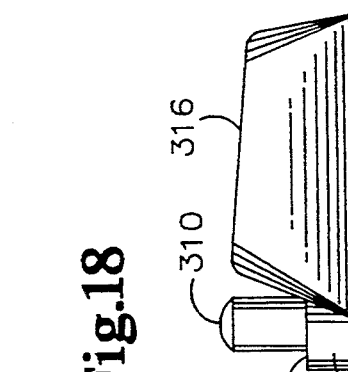
FIG. 17 is a right side view of the compound key of FIG. 14.
Figures 15, 18:
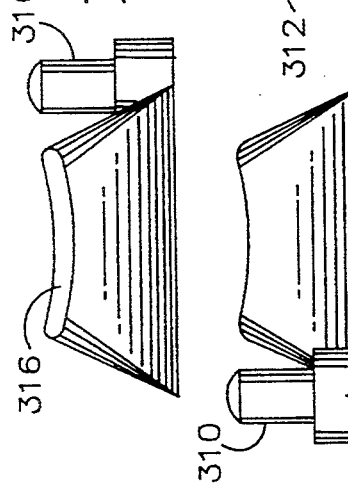
FIG. 15 is a front elevational view of the compound key of FIG. 14.
FIG. 18 is a rear elevation view of the compound key of FIG. 14.
Figure 16:
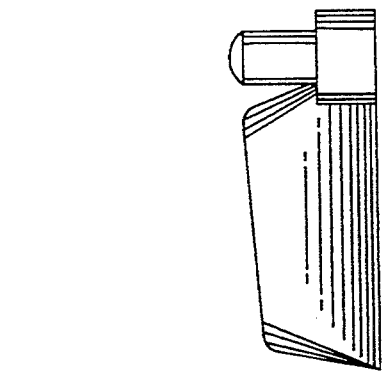
FIG. 16 is a left side view of the compound key of FIG. 14.
Figure 20:
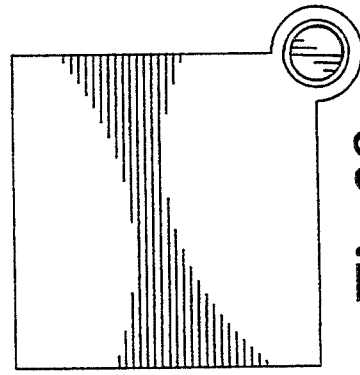
FIG. 20 is a bottom view of the compound key of FIG. 14.

FIGS. 1–6 illustrate a first embodiment of the invention. This is a compound key which has a pointing stick 110 that extends through an aperture 112 in one of the slanted sides 114 of the key cap. By a "pointing stick" we mean a button or stalk which is coupled to force sensors, as further described below, for cursor control. Since the pointing stick extends slightly above the key cap, it can be actuated and controlled by the user independently of the key cap which is used for typing. The beveled side wall 114 of the key cap has a rounded extension 116 in which the aperture 112 is formed. Aperture 112 is sized to allow slight lateral motion of the pointing stick without interference. The pointing stick may include an enlarged head or top portion 118 for better contact with the user's fingertip. The extension 116 is limited in size so that it does not interfere with adjacent key caps in a keyboard, as shown in FIG. 5. The head of the pointing stick, however, may extend slightly over adjacent key caps as shown without contacting them. The internal components and operation of the compound key are described below with reference to the embodiment of FIGS. 27–33.

FIGS. 7–13 illustrate a second embodiment of the invention. This is similar to the first embodiment, except that a pointing stick 210 extends through an aperture 212 formed adjacent the corner of a key cap 214. The key cap in this case is not extended beyond its usual dimensions. This ensures that the modified keycap 214 will fit within even a very compact keyboard, such as in a laptop computer, without interfering with adjacent keys. The internal components and operation of the compound key are described below with reference to the embodiment of FIGS. 27–33.

Figure 19:
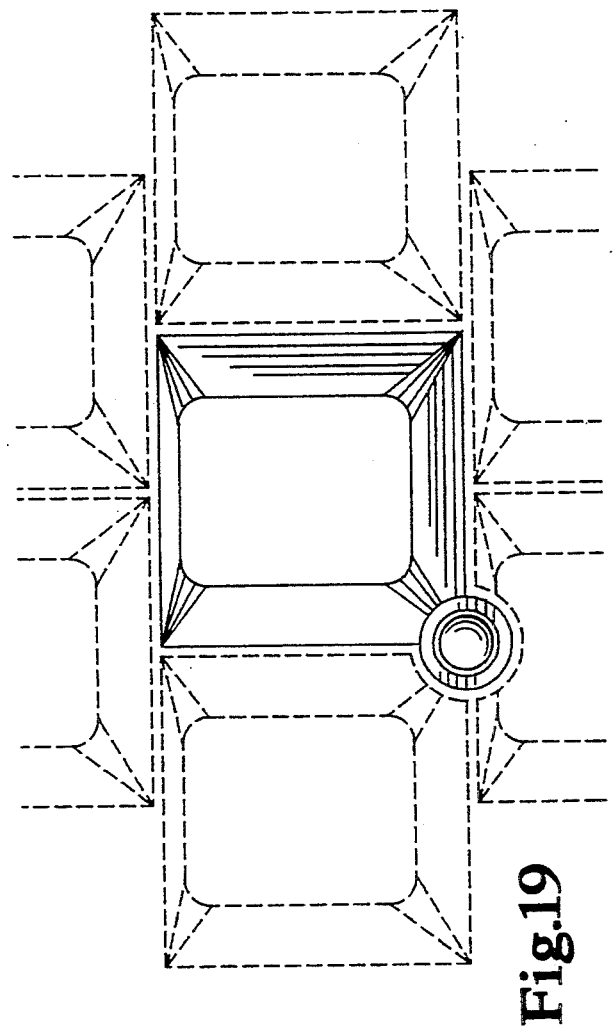
FIG. 19 is a top view of the compound key of FIG. 14 shown disposed in a computer keyboard, the surrounding keys being shown in phantom.
Figure 21:
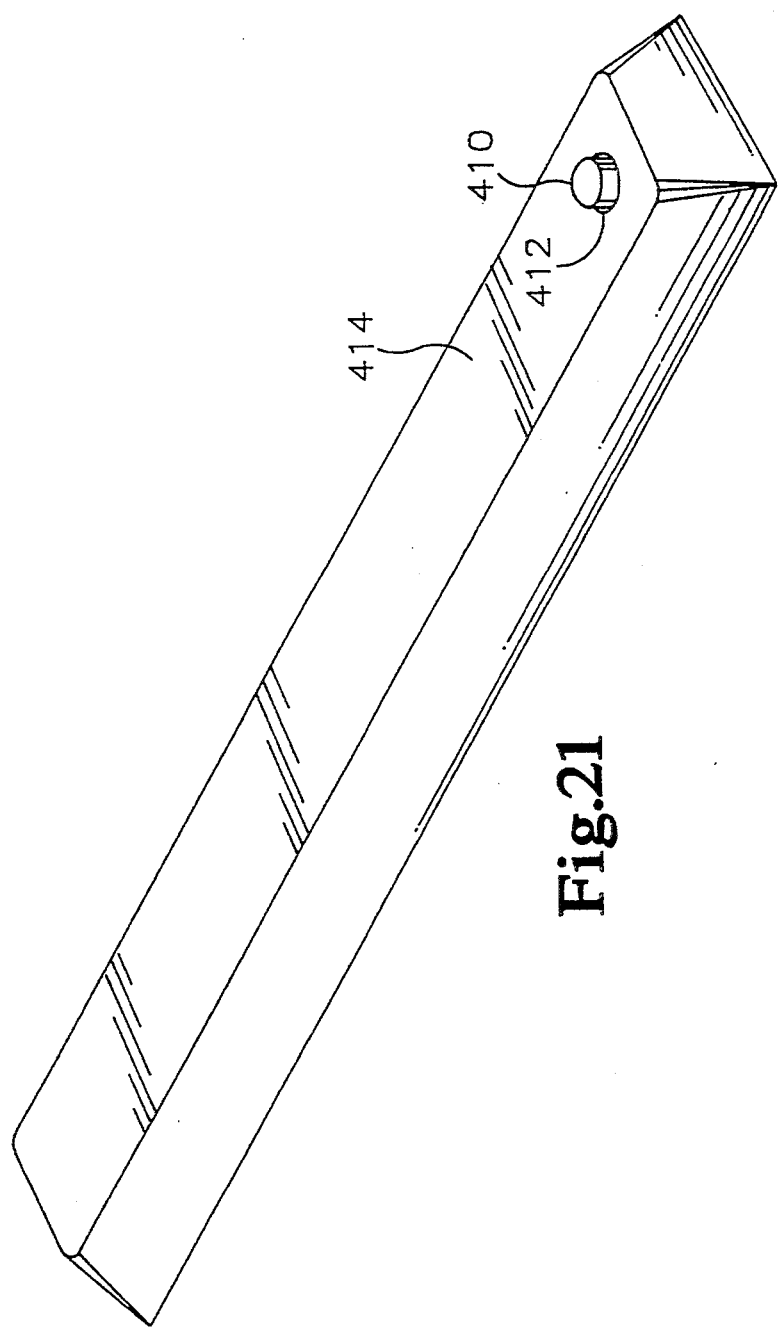
FIG. 21 is a perspective view of the fourth embodiment of the compound key.

FIGS. 14–20 illustrate a third embodiment of the invention. This is similar to the second embodiment, except that pointing stick 310 is disposed in an aperture 312, which is formed in an extension 314. Extension 314 is formed adjacent a corner, preferably a front corner, of a key cap 316. In a keyboard, if required by keyswitch spacing, adjacent keycaps can be modified to avoid interference with the compound key, as illustrated in FIG. 19. The internal components and operation of the compound key are described below with reference to the embodiment of FIGS. 27–33.

FIGS. 21–26 illustrate a fourth embodiment of the invention. This is similar to the previous embodiments, except that here a pointing stick 410 extends through an aperture 412 formed in a space bar key cap 414. This embodiment also has the advantage of providing a separate pointing stick like a joystick without using any additional keyboard space. The internal components and operation of the compound space bar key are described below with reference to the embodiment of FIGS. 27-33.

FIGS. 27-33 illustrate a fifth embodiment of the invention. FIG. 27 is a perspective view of modified keycaps 388, 369, 370. One of the keycaps 388 is modified to house a pointing stick, while the other key caps 369, 370 are modified so as to fit closely around the pointing stick housing without contact. Key cap 388 includes a top surface 402 and depending side walls, e.g. side wall 404, forming a perimeter of the key cap. FIG. 28 is a front elevational view of the keycap combination, and FIG. 29 is a rear elevational view and FIG. 30 is a side elevational view. FIG. 31 is a top view of the keycap combination and pointing stick as implemented in a keyboard such as a computer keyboard, showing surrounding keycaps of the keyboard in dashed lines.

Figure 32:
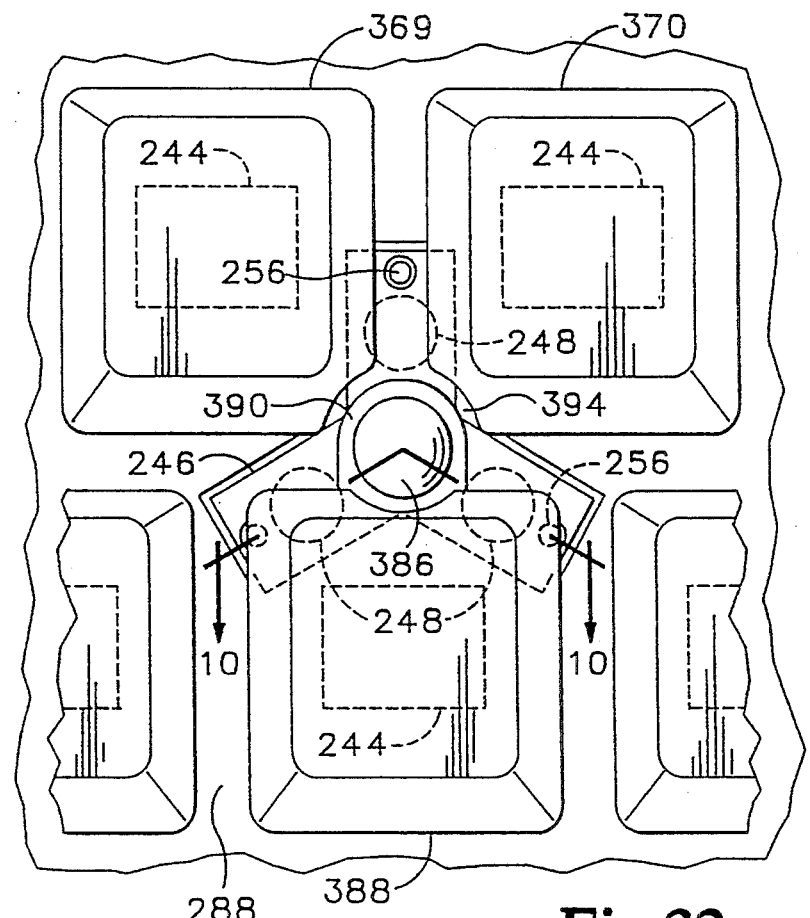
FIG. 32 is a top view showing in dashed lines location of the force actuator and force sensors.

FIG. 32 shows a top view of one embodiment of the keycap combination and pointing stick in greater detail as implemented in a keyboard. Referring to FIGS. 27-32, key cap 388 is specially adapted to house the pointing device. Keycap 388 includes a generally rounded extension 390 (FIG. 32) formed in the perimeter of the key cap. Extension 390 has a central aperture 392 (see FIG. 33), sized to accommodate and clear (not touch) a pointing stick shah 384 positioned therein. Extension 390 of keycap 388 is generally flat on its top surface. The top surface of extension 390 is generally lower than the top surface 402 of keycap 388. The keycaps overlie a plastic substrate 288. Substrate 288 has an aperture formed in it at each key location, as best seen in FIG. 33.

Keycaps 369 and 370 are modified in the corners adjacent keycap 388 so as to form a concave gap 394 between the keycaps and extension 390, as best seen in FIG. 32. This arrangement has the advantage of providing a pointing function in a keyboard without having to relocate any keyswitches away from their usual, standard locations on the keyboard. Accordingly, typing may be done in the usual manner.

A pointing stick tip 386 is attached to shaft 384 and preferably has a diameter greater than aperture 392. Note in FIGS. 27-30 that the tip extends slightly above the top surfaces of the keycaps to provide convenient access for manipulation of the pointing stick, for example for cursor control, without interfering with the adjacent keycaps.

Figure 33:
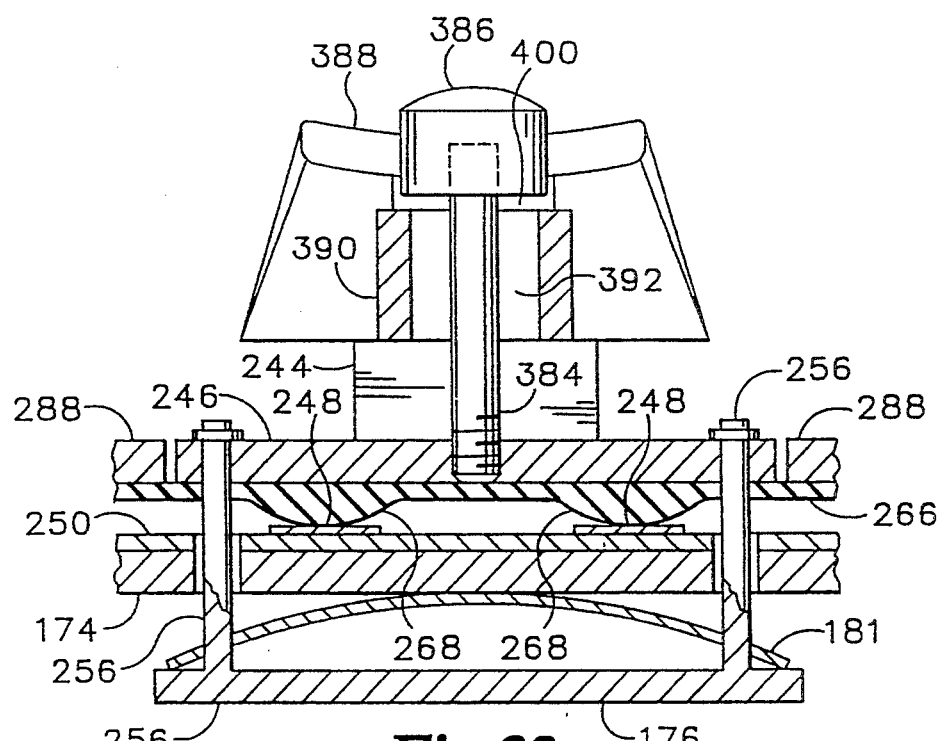
FIG. 33 is cross-sectional view taken along line 10—10 of FIG. 32.

FIG. 33 is a cross-sectional view of the keycap and pointing stick combination described, taken along the inverted-V shape cross section line 10—10 of FIG. 32 as shown. Referring to FIG. 33, a keycap guide 244 is shown located below the keycap 388. Sensing areas 248, preferably are formed of force-sensitive resistors on a membrane 250. The shaft 384 is fixed to a rigid actuator plate 246. Note that the shape of actuator plate 246, as best seen in FIG. 32, fits between the keycap guides 244 of surrounding keys. A pliable sheet, such as rubber, 266 is disposed between the actuator plate and the sensors. Actuator bumps 268 are formed in and protrude from the rubber sheet toward the sensors, for transmitting forces from the shaft to the sensors.

Pointing stick tip 386 is shown on top of shaft 384, as noted above. There is a gap 400 between the bottom of tip 386 and the top surface of rounded extension 390 on keycap 388. The hole 392 in extension 390 provides for relative movement between the shaft 384 and keycap 388 without contact between the shaft 384 and the keycap 388. This is necessary for two reasons. The first reason is so the pressing of keycap 388 does not affect the pointing stick. The second reason is to ensure that all forces applied to tip 386 by user's finger reach the sensors located a locations 248. Any contact between the pointing stick and the keycap would result in erroneous joystick sensor readings.

Shaft 384 may be joined to actuator plate 246 by any suitable means. For illustration, a threaded connection is shown. A preload spring assembly 181 acts between reference plate 174 and retainer assembly 176 to apply a preloading force at all times. Applying a pre-load force to the force-sensing resistor elements is important for the following masons. First, force-sensing resistor elements provide a high resistance when no force is applied to the element. When even small initial force is applied, on the order of a hundred grams, the sensing elements may suddenly drop to an initial resistance on the order of a few hundred thousand ohms. This drastic change, or step response, is disconcerting to an operator and undesirable for most applications. The application of a pre-load force to the sensing areas eliminates this initial step response problem.

Connectors, such as rivets or screws, may be used to couple the retainer 176 to the actuator plate 246. Preferably, posts 256 are integrally formed in the retainer 176 and extend up through the intermediate members and through the actuator plate. The posts are secured by retainer rings as shown. Note that reference plate 174 and membrane 250 have oversized apertures through which the posts extend, so that the posts do not contact these members even when the pointing stick is in use.

During a pointing operation, for example to move a cursor, all forces imparted to the pointing stick 386 by an operator are transmitted to the actuator plate 246 and, through the actuator surfaces, to the force-sensing areas 248. As noted above, the force-sensing areas are pre-loaded to a predetermined operating point, so that a lateral force applied to the button 386 results in a differential electrical signal because the force applied to some of the force-sensing elements is increased while the force applied to other force-sensing elements is decreased. An arrangement of three sensors as shown, or four sensors, may be used. In the latter case, a force applied in any direction off the X or Y axis results in resistance to change in all four sensing elements.

The pre-load spring 181 also affords the advantage of neutralizing manufacturing variations in the various components described, as well as obviating a pivot's high tolerance requirements. In use, the compressed pre-load spring takes up variations in thickness of the elements in between the backup plate and the actuator plate to avoid any play or wobble in the assembly. As long as the force-sensing elements are biased to some reasonable operating point, a processing unit coupled to the force-sensing array can be arranged to calibrate itself to define zero force as whatever resistances are provided by the force-sensing elements in the absence of externally applied forces.

Noteworthy is the absence of any pivot type supporting means as in a conventional joystick. Rather, the pointing stick is supported solely by the actuator plate 246. Accordingly, downward or Z direction forces are coupled through the actuator surfaces to the force sensing areas 248. The present apparatus thereby measures the overall or net force applied by an operator. The net force can easily be computed by summing the forces on all the sensors. The net applied force information is useful in many applications, for example, to control cursor speed, or to provide Z axis control. Increasing the apparent cursor speed in response to a greater operator applied force provides a natural and ergonomically efficient response.

Having illustrated and described the principles of my invention in a preferred embodiment thereof, it should be readily apparent to those skilled in the art that the invention can be modified in arrangement and detail without departing from such principles. I claim all modifications coming within the spirit and scope of the accompanying claims.

I claim:

1. A compound key for use in a computer keyboard for both typing and cursor control, comprising:

a key cap coupled to a keyswitch for typing a predetermined alphanumeric character, the key cap having an aperture formed through it along a generally vertical direction for receiving a shaft;

a rigid shaft sized and arranged so as to extend through the aperture to a predetermined height slightly above a top surface of the key cap for actuation by a user's fingertip;

the aperture being sized so as to allow slight lateral motion of the shaft for cursor control; and force sensing means coupled to the shaft for sensing forces applied to the shaft by the user for cursor control.

2. A compound key according to claim 1 wherein the key cap has a slanted beveled side wall, and the aperture is formed in the side wall without enlarging the size of the key cap.

3. A compound key according to claim 1 wherein the key cap is generally square and the aperture is formed adjacent a corner of the key cap.

4. A compound key according to claim 1 wherein the shaft includes an enlarged head portion for receiving force applied by the user's fingertip;

the head portion arranged so as to extend slightly over the top surfaces of adjacent key caps when the compound key is deployed within the typing array of keyswitches in a computer keyboard.

5. A compound key according to claim 1 wherein the key cap further includes a n extension protruding therefrom, and the aperture for receiving the shaft is formed in the extension.

6. A compound key according to claim 5 wherein the extension is sized so as to clear adjacent key caps when the Compound key is deployed within the typing array of keyswitches in a computer keyboard.

7. A compound key according to claim 5 wherein the extension is located adjacent a front corner of the key cap.

8. A compound key according to claim 1 wherein the key cap is an elongated space bar key cap.

9. An apparatus for use in a computer keyboard comprising: a first key cap coupled to a first keyswitch for typing a first alphanumeric character;

a second key cap coupled to a second keyswitch for typing a second alphanumeric character; and a third key cap coupled to a third keyswitch for typing a third alphanumeric character;

the first, second and third key caps being arranged adjacent each other in a generally triangular configuration for fitting into a typing array of key caps in a computer keyboard;

the first key cap including a top surface and depending sidewalls, the sidewalls together forming a perimeter of the key cap, and further including an extension formed in said perimeter of the key cap, the extension including a central aperture formed therein for receiving a shaft;

a rigid shaft, sized and arranged so as to extend through the aperture for actuation by a user's fingertip;

the aperture being sized so as to allow slight lateral motion of the shaft for cursor control;

force sensing means coupled to the shaft for sensing forces applied to the shaft by the user for cursor control; and at least one of the second and third key caps having a modified region so as to form a generally concave gap between the said one key cap and the extension of the first key, whereby the said extension does not interfere with normal operation of the adjacent key cap.

10. An apparatus according to claim 9 wherein the extension is formed along a rear side wall of the first key cap; and at least one of the second and third key caps includes a respective modified portion so as to form a corresponding concave gap between said one key cap and the extension of the first key cap, whereby all three key caps fit closely together and provide for cursor control through the said shaft without interference with normal typing operations.

11. An apparatus according to claim 9 wherein the shaft extends generally upward through the aperture to a predetermined height slightly above the top surface of the first key cap so as to receive force applied by the user's fingertip for cursor control without actuating the first key switch.

* * * * *